United States Patent Office

2,729,565
Patented Jan. 3, 1956

2,729,565

MEAT CASING AND PROCESS FOR USING THE SAME

Robert E. O'Brian, Des Moines, Iowa, and Edward D. O'Brian, Whittier, Calif.

No Drawing. Application January 22, 1954, Serial No. 405,662

2 Claims. (Cl. 99—176)

The present invention relates to a new and improved meat casing and to a process for using the same. More specifically it relates to casings which are primarily employed in the manufacture of meat products of the sausage family, and to a method of creating products of this variety from the casings of invention.

For many hundreds of years sausages and related products have been manufactured by placing ground meat particles in cleaned animal intestines. This broad procedure suffers from a number of disadvantages which seriously limits application at the present time. Cleaned intestines, in spite of processing, are frequently unpleasant to eat. Also their diameter and wall thickness are apt to vary, causing difficulty during modern high-speed stuffing.

It has been proposed to utilize synthetic materials such as regenerated cellulose or cellophane as casings for meat products of the sausage family. Such substitutions of synthetic materials for natural casings have been successful in varying degrees. At the present time the largest volume of these synthetic casings is used in the manufacture of frankfurters of the so-called "skinless" variety. In the manufacture of this product a ground meat mixture capable of "setting up" into a coherent mass upon cooking is normally forced under pressure into a cellophane casing, the stuffed meat is cooked in the casing so as to "set up" or form a coherent mass of the meat, and then the casing is removed by a stripping or peeling operation. This latter operation is objectionable because it is time consuming, and hence expensive, and because many frankfurters are damaged during this removal of the casing.

It is an object of the present invention to produce a new and improved type of meat casing. Another object of the present invention is to produce meat casings which are digestible, and which may be decomposed by exposure to moisture for a predetermined time. A further object is to utilize such casings in a process for the manufacture of "skinless" meat products such as "skinless frankfurters" which eliminates the separate stripping operation described above. Further objects of the invention, as well as the advantages of it will be apparent from the balance of this specification and the appended claims.

The above broad general objects are achieved by forming a digestible, seamless, starch tubing and by using this tubing as will be more fully explained. The composition of this starch tubing is quite important, as by varying it casings of varying degrees of solubility can be produced. Also various other properties of the tubing are affected by the composition.

The tubings which are preferably employed as meat casings in accordance with the invention are best termed amylose tubings inasmuch as their major ingredient is amylose, and in fact, they may consist substantially entirely of amylose, although they are considered satisfactory for the process of the invention only when they comprise a major proportion of amylose and a minor proportion of amylopectin.

It is extremely difficult to give any precise range of proportions of amylose and amylopectin within the tubings of the invention because of the multitude of factors which must be considered in arriving at such proportions. Included in such factors are the source of the starch molecules employed, the amount of contaminants within the starch, the variation within the particular process steps employed, the thickness of the final tubings produced, the desired solubility of the final casing, the casing strength desired, and the exact treatment cycle to which such casings are to be subjected. In general it may be stated that casings for use with the process of the invention preferably comprise from about 70 to 95% by weight of amylose and from about 30 to about 5% by weight of amylopectin. At the present time it is considered advisable to empirically establish the proportions of these two ingredients employed for any application by a few routine experiments.

Minor proportions of agents such as glycerine, sorbitol, or the like serving to soften and otherwise improve the properties of the tubings of the invention can be employed within such tubings. In order not to limit the strength of casings as herein defined such secondary ingredients are preferably used in an amount less than about 20% by weight of the amylose and amylopectin present.

The starch tubings employed as meat casings in accordance with this invention can be prepared by using the broad procedure described by Wolff et al. in Ind. Eng. Chem. 43, 916 (1951) and the various patents issued to the authors of this article. In general the preparation of such tubings involves the steps of dissolving the amylose and amylopectin employed in an aqueous solution containing a water soluble complexing agent, removing the complexing agent from the solution, forming a film and drying the formed film. Small quantities of a seamless tubing of this type can be created by continuously casting a starch solution on the inside of a continuously rotating, horizontally disposed metal cylinder having a highly polished interior, drying the so cast film in situ as by the use of a hot air stream, and then carefully removing the dried tubing. Forming processes which comprise extruding a film of a starch solution as indicated above through an orifice into a drying atmosphere can also be employed. With such processes the use of an internal drying stream within the tubing is frequently desirable.

Either after a tubing as indicated above is formed, or while it is being dried the strength of the tubing can be frequently increased by stretching this tubing so as to accomplish a degree of molecular orientation without tearing the film. The amount of such stretching desired will vary with the composition of the film and the other factors indicated above. Becaue of such variation it is frequently best to impirically determine the most advantageous amount of stretching by a few simple tests. As a guide in this matter it can be stated that increasing the length of a starch film containing about 95% amylose and 5% amylopectin about 10% has produced advantageous results.

Agents such as glycerine or sorbitol as indicated above can be incorporated into the casings of this invention either by adding these agents to the starch solution prior to the formation of this solution into films or by soaking the tubings indicated, either prior to, during, or after the stretching operation referred to above. When they are added to a solution they are preferably of a water soluble character and are not extremely volatile during drying.

The use of starch tubings indicated above in accordance with the process of this invention is extremely simple. Because of this simplicity it is believed that the process herein described is destined to supplant commercially other processes for manufacturing products of the sausage family such as were briefly indicated at the start of this specification. Because the starch casings herein described are completely digestible they may be eaten without removal, but this is not normally considered desirable since it is unnecessary.

The first step of the process of the invention consists of packing ground meat capable of "setting up" on cooking in a starch tubing in the same manner as ground meat is placed within other types of casings. Because of the high pressures normally employed, and because no digestible adhesives are presently known for amylose which satisfactorily stand such pressures it is preferred that tubings or casings employed be of a seamless variety.

The second step of this process consists of cooking meat packed within a casing as described so as to "set up" or form a coherent mass. Generally this cooking is carried out at periods of from 15 to 60 minutes in length using a 15 pound steam, although other periods and temperatures can be used. The casing employed for any product preferably is chosen so as to contain amylose admixed with sufficient amylopectin so as to decompose during such cooking in the presence of moisture, either as steam or as hot water, after the meat has become coherent. The term "decompose" as used here means that the casing tends to be broken up and to dissolve in the moisture present so as to cease its existence as a continuous film. If desired the casing can be formed so as to require slight additional cooking beyond that usually used so as to decompose.

As an example of the process of the invention three quarter inch outside diameter tubing having walls approximately 0.040 inch thick was stuffed with a commercial ground frankfurter mixture in the same manner as other casings are stuffed, and then was cooked for 45 minutes with 15 pound steam. The casing consisted of approximately 80% amylose and 20% amylopectin and was decomposed at the end of this period.

Those skilled in the art will realize that a number of variations may be made within the broad scope of this disclosure. As an example of such variation casings as herein defined may be employed where meat products are cooked in other manners than with steam or hot water, and then may be removed with moisture as herein described. Such variations are to be considered as part of the invention insofar as they are defined by the appended claims.

We claim:

1. An artificial meat casing which will decompose in the presence of moisture comprising of from about 70 to about 95% by weight of amylose and from about 5 to about 30% by weight of amylopectin in which the molecules have been oriented by stretching.

2. A process of forming a meat product which comprises packing ground meat capable of forming a coherent mass upon cooking into a digestable tubing comprising of from about 70 to about 95% by weight of amylose and from about 5 to about 30% by weight of amylopectin in which the molecules have been oriented by stretching, and cooking said meat particles in said tubing so as to cause said meat to form a coherent mass, and decomposing said tubing by the action of moisture.

References Cited in the file of this patent
UNITED STATES PATENTS 2,627,466     Lewis _____ Feb. 3, 1953

OTHER REFERENCES

"Industrial and Engineering Chemistry," April 1951, vol. 43, No. 4, pages 911 to 919, inclusive.